United States Patent [19]

Antonius Koppens

[11] Patent Number: 5,129,353
[45] Date of Patent: Jul. 14, 1992

[54] APPARATUS FOR FORMING A CONTINUOUS LAYER OF GRANULAR AND/OR PULVERULENT FLOWABLE MATERIAL, AND ALSO A BREADCRUMB COATING MACHINE HAVING SUCH AN APPARATUS

[75] Inventor: Wilhelmus F. Antonius Koppens, Bakel, Netherlands

[73] Assignee: Koppens Machinefabriek B.V., Bakel, Netherlands

[21] Appl. No.: 520,662

[22] Filed: May 8, 1990

[30] Foreign Application Priority Data

May 10, 1989 [NL] Netherlands ............ 8901175

[51] Int. Cl.⁵ .................. A23P 1/08; B05C 19/06
[52] U.S. Cl. ............................ 118/16; 118/24; 118/312
[58] Field of Search .......... 118/13, 16, 24, 308, 118/312; 198/500, 561

[56] References Cited

U.S. PATENT DOCUMENTS

| | | | |
|---|---|---|---|
| 2,389,845 | 11/1945 | Erickson | 222/240 |
| 2,659,338 | 11/1953 | Harrisson | 118/312 |
| 2,855,893 | 10/1958 | Greer | 118/16 |
| 3,045,640 | 7/1962 | Hill et al. | 118/16 |
| 3,759,218 | 9/1973 | Korstvedt | 118/18 |
| 3,885,519 | 5/1975 | Orlowski | 118/16 |
| 4,333,415 | 6/1982 | Miller | 118/24 |
| 4,366,628 | 1/1983 | George | 198/561 |
| 4,496,084 | 1/1985 | Booth et al. | 222/282 |
| 4,497,244 | 2/1985 | Koppens | 118/24 |
| 4,516,524 | 5/1985 | McClellan et al. | 118/683 |
| 4,693,911 | 9/1987 | Moreau | 118/629 |
| 4,846,097 | 7/1989 | Hansson | 118/16 |

FOREIGN PATENT DOCUMENTS 0113927 7/1984 European Pat. Off.
2099276 12/1982 United Kingdom.

Primary Examiner—W. Gary Jones
Assistant Examiner—Todd J. Burns
Attorney, Agent, or Firm—Webb, Burden, Ziesenheim & Webb

[57] ABSTRACT

An apparatus for coating an article on both sides with a continuous layer of granular flowable material of constant thickness. The apparatus includes a belt for transporting the articles, with the material being capable of passing through the belt. The belt further includes an uppermost run and a lowermost run, with guide plates positioned beneath the uppermost and lowermost runs, with the material and the belt capable of being moved over the guide plates. The lowermost run of the belt is twice oppositely guided downward in the direction of the belt's movement to form three belt sections in the lowermost run. The three belt sections further include a first belt section, a second belt section positioned beneath the first belt section, and a third belt section positioned beneath the second belt section. The apparatus further includes a buffer hopper positioned beneath the first belt section, with the outlet of the hopper positioned above the guide plate of the lowermost run, for receiving the material, and for automatically compensating fluctuations in the material supply.

18 Claims, 2 Drawing Sheets

APPARATUS FOR FORMING A CONTINUOUS LAYER OF GRANULAR AND/OR PULVERULENT FLOWABLE MATERIAL, AND ALSO A BREADCRUMB COATING MACHINE HAVING SUCH AN APPARATUS

The present invention relates to a method for forming a moving, continuous bed which is composed of granular and/or pulverulent flowable material and which is of constant thickness. Such a method is known from NL-A-7810080. In this known method, the material is deposited on the belt from a feedstock container and is more uniformly distributed by means of a pressure roller.

This known prior art method is beset with a number of disadvantges. First of all, the pressure roller only functions satisfactorily if the supply of material does not vary too excessively on the belt. There is a risk that, in the event of brief interruptions of supply of material to the pressure roller, too little material will be present locally in the layer treated by the pressure roller. If the supply of material to the pressure roller is excessively large, there is the possibility that the material will be too severly compressed. In the case of coarse-grained, sensitive material, in particular, this compression of material by the pressure roller is undesirable. Such coarse-grained material could readily be pulverized by the pressure roller.

The object of the present invention is, therefore, to provide a method of forming a moving, continuous bed which is composed of granular and/or pulverulent flowable material and which is of constant thickness which lacks these disadvantages. This object is achieved according to the present invention by collecting material from a first moving bed so as to form a buffer stock, and by subsequently delivering material from this buffer stock in a regular fashion so as to form a second moving bed which is continuous. In the method according to the invention, the material is not fed to the belt directly but via the buffer. Provided the buffer remains filled, it is capable of compensating automatically for fluctuations in the material supply. In the event of a supply which is temporarily too low, it empties further, while, on the other hand, in the event of a supply which is temporarily too high, upon exceeding a predetermined amount of material in the stock, the excess material is discharged from the stock without being used to form the second bed. Because the material is not pressed on as does in fact happen in the known prior art method, sensitive material can also be handled well with the method according to the invention.

The excess material may be fed to the first bed, so as to redistribute this, by means of the buffer, over the second bed. In this way, the risk that fluctuations in the material supply from the first bed into the buffer stock would lead to fluctuations or disruptions in the flow of material in the second bed may be reduced further.

The invention is furthermore related to an apparatus for forming a continuous layer which is composed of granular and/or pulverulent flowable material and which is of constant thickness, which apparatus has at least one belt, wherein said material is capable of being passed the belt, the material being capable of being transported with the belt over a guide plate situated beneath the belt. Such an apparatus is also disclosed in NL-A-7810080, and this prior art apparatus shows the disadvantages associated with the method, as described above. According to the present invention, this apparatus is improved in that a buffer is provided for the material, wherein the buffer discharges the material onto one belt or part of a belt, and in which the buffer is being fed with material by another belt or part of a belt.

The known prior art apparatus includes a circulating belt, under each run of which a guide plate is situated, and also includes a deflector near the point where the belt is guided round for transferring the material from the lowermost to the uppermost run. The apparatus according to this invention is constructed in a manner such that the discharge opening of the buffer is situated near and above the lowermost run and that the feed opening of the buffer is situated near and beneath another section of the belt, under which section a guide plate is situated which extends in the direction of movement of the belt up to the feed opening. The buffer receives the material from one section of the belt. This fed material may be, for example, the residue of a preceding production phase in which the material has been used for manufacturing particular end products and in which only a limited amount of material has been removed. As a result of this, the layer may be distributed very irregularly over the belt. In the buffer, this residue is now collected and then delivered onto the lowermost run in a regularly distributed manner.

In this process, the total transportation movement of the excess material remains limited, which is important especially in the case of sensitive material. The fact is that such material may readily be pulverized during transportation, as a result of which the content of fine, pulverulent material increases at the expense of the content of coarser, granular material. This is very undesirable since the coarse and fine component demix, in which the coarse component up on top and the fine component below. In this case, the risk is great that the apparatus no longer delivers a constant mixture over the layer. The apparatus may deliver a lower layer composed of a relatively large amount of fine material and an upper layer containing a relatively large amount of coarse material. In that case, end products having a constant quality can no longer be delivered.

Another object of the invention is, therefore, also to provide an improvement in this respect, which improvement is such that a layer of material can always be provided in which the coarse and fine components are uniformly distributed over the thickness of the layer. This object is achieved in that the lowermost run of the belt is twice oppositely guided downwards in the direction of movement in accordance with three belt sections extending essentially beneath one another, in that there is located between the uppermost and central belt section the buffer, whose outlet is situated above a guide plate situated beneath the lowermost belt section, and in that the end edge, which is foremost in the direction of movement of the uppermost belt section, of the guide plate which is situated beneath the uppermost belt section is situated near the rearmost edge of the buffer in the direction of movement. This design has a favourable effect on the maintenance of the desired mixture distribution of coarse- and fine-grained material. Owing to the speed with which the belt, and therefore the material, advances, the coarse-grained constitutents thereof are propelled somewhat further in the direction of movement of the belt than the fine-grained portions when they fall from the guide plate. As a result, a relatively larger portion of the coarse-grained material is able to reach the buffer; the fine-grained material is not propelled as far, with the result that a relatively larger portion of the fine-grained material is unable to reach the buffer, falls over the overflow and is removed. This occurrs especially if partial demixing has taken place, in which case, the lowermost portion of the layer is composed of a relatively large amount of fine-grained material. This falls away rapidly after leaving the guide plate without it being able to be entrained by the coarse-grained material. Therefore, the ratio of the mixture conveyed round does not have to change, for example, by the coarser material nevertheless still being pulverized to some extent.

In some mixtures it may be desirable that the mixture contains as little fine-grained material as possible; in the case, too, the apparatus according to the invention has a beneficial effect since any fine-grained material formed while the coarse-grained material is being conveyed round is automatically removed via the overflow.

The apparatus is preferably of a construction such that an overflow plate adjoins the rearmost edge of the buffer in a downwardly sloping direction and extends beyond, or next to, the second belt section in a manner such that the granular material fed by the first belt section first, falls mainly into the buffer and second, when the latter is full, overflows towards the overflow plate. With this construction it is possible to avoid the overflow material following if the feed of material is extremely great onto, the already formed continuous layer. The excess material falls via the overflow plate through the penetrable belt without affecting the thickness of the layer.

Preferably, the buffer comprises a hopper having an essentially vertical hopper plate and also includes a hopper plate which is situated behind it the essentially vertical hopper plate in the direction of movement of the uppermost belt section and which extends downwards at an angle towards the essentially vertical hopper plate. These two hopper plates define a hopper gap extending over the width of the guide plates. If a slot with a size essentially corresponding to the belt thickness it is provided between the essentially vertical hopper plate and the guide plate situated beneath the central belt section and discharge gap for the material is situated between the sloping hopper plate and said guide plate, the desired dosaging of the material can be obtained by a suitable choice of the hopper gap and the discharge gap. To reduce the risk of the occurrence of blockages, the discharge gap may be chosen to be larger than the hopper gap.

According to a preferred application of the invention, the apparatus is used in a machine for coating edible products with breadcrumbs. Such machines are also disclosed in NL-A-7810080. In this prior art apparatus, the outlet of the means for providing the uppermost layer of breadcrumb coating materials is situated above the uppermost run of the belt. In the machine according to the invention the excess material originating from the uppermost run of the belt finishes up on the lowermost run, after which it is fed to the buffer.

In this connection, the machine is preferably provided with an apparatus for forming a continuous layer of granular and/or pulverant flowable material of constant thickness, and the guide plate extends below the uppermost run of the belt in the direction of movement of said run from the deflector to a point above the guide plate beneath the uppermost section of the belt of the lowermost run. In this manner, the beneficial effects already mentioned relating to avoiding demixing and the formation, of a layer having a uniform thickness, as already discussed, are achieved.

If, the guide plate beneath the uppermost belt section of the lowermost run extends downwards at an angle at its end facing the overflow plate and its front edge is situated at a distance, in the direction of movement of said belt section, from the rearmost edge of the hopper in a manner such that, if the material in the hopper has accumulated to a level higher than the rearmost edge, the material subsequently fed impinges on said material which has accumulated to a point above the rearmost edge of the hopper and overflows over the overflow plate, the excess overflowed material can immediately be conveyed round again.

The outlet may also be provided with a sieve over which the breadcrumb coating grains can be moved in a direction opposite to the direction of movement of said apparatus run and whose sieve openings are larger than the size of the largest grains. The coarse-grained material slides further over the sieve than the fine-grained material. As a result, the products to be treated are first coated with a coarse-grained layer and it is only after that that the fine-grained material falls in between. All these features have a beneficial effect on the adhesion of the coarse-grained material and the outer appearance of the final product.

The machine has a feedback container for the material with a transporation device situated therein for feeding the inlet of the means for providing the uppermost layer of material. According to the invention, a sensor linked to the transportation device may be situated near the outlet of said means, which sensor controls the transportation device as a function of the quantity of material discharged from the outlet.

The invention will be explained in more detail below with reference to an exemplary embodiment shown in Figures.

Figure 1:
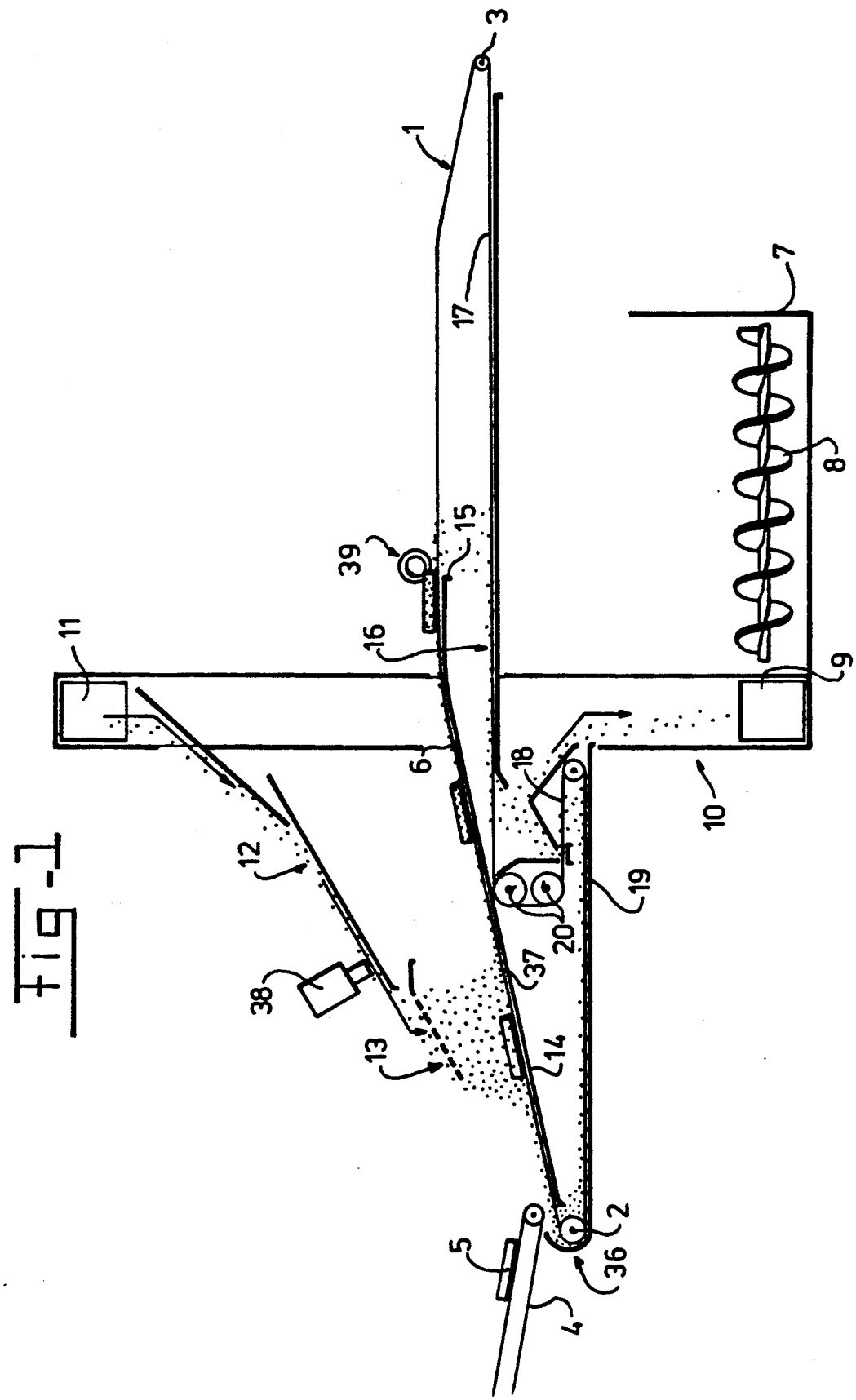
FIG. 1 shows a machine for coating edible products with breadcrumbs which is provided with an apparatus according to the present invention.
Figure 2:
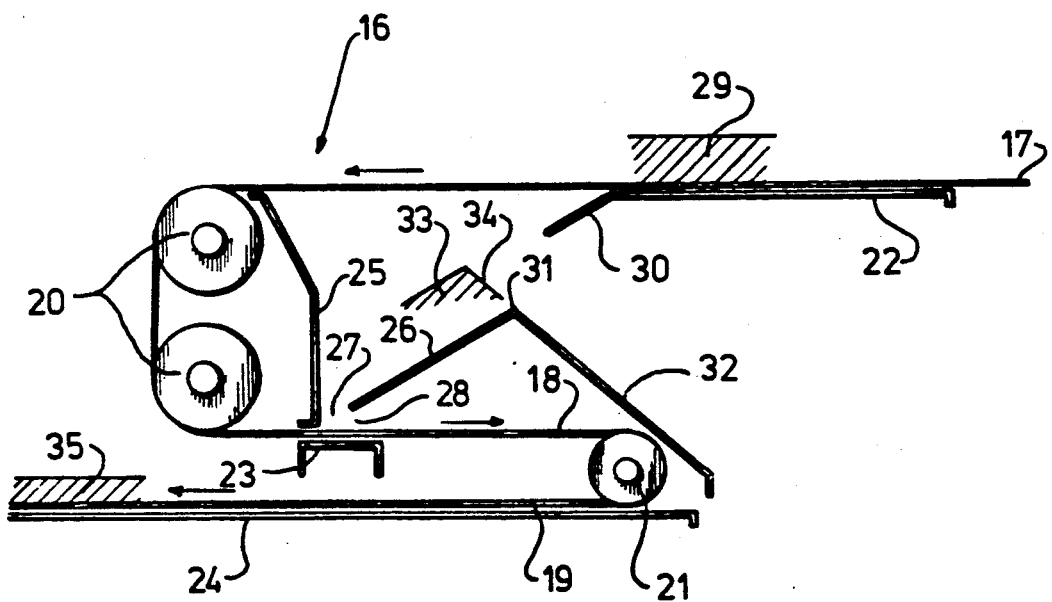
FIG. 2 shows the apparatus according to the invention in accordance with details II of FIG. 1.

The machine shown in FIG. 1 for coating edible products with breadcrumbs has, in a known manner, an endless belt 1 which the granular and/or pulverulent breadcrumb coating material can pass through and which is conveyed round over two end rollers 2, 3. The direction of movement of the belt is indicated by arrows (see FIG. 2). The products 5 to be coated with breadcrumbs are fed by means of a separate conveyor 4 onto the uppermost run 6 of the belt. At the trailing end in the direction of movement of said uppermost run 6, the breadcrumb coated products are subsequently removed by means of an apparatus which is not shown.

The machine is furthermore provided with a feedback container 7 for the breadcrumb coating material, which feedback container contains a screw jack 8 which feeds the breadcrumb coating material to the inlet 9 of a pumping apparatus 10. This pumping apparatus 10 pumps the breadcrumb coating material to the outlet 11, where the breadcrumb coating material slides over the slide track 12 towards the sieve 13. During this process, the coarse grains of the breadcrumb coating material slide further across the sieve 13 than the finer grains in a manner such that mainly coarse-grained material falls onto the products to be coated with breadcrumbs first and only after that will the fine-grained material fall onto the product. As a result, the fine-grained material finishes up between the coarser grains on the product and the desired outwardly appearance of the final product can be ensured.

Situated beneath the uppermost run of the belt is the guide plate 14. The breadcrumb coating material fed via the sieve 13 moves with the belt 1 over the guide plate 14 until the trailing edge 15, trailing with respect to the direction of travel of belt 1, of the guide plate 14 is reached. The breadcrumb coating material which has not yet adhered to the final products falls through the belt 1 after passing the trailing edge 15 onto the lowermost run 16 of the belt 1. In this connection, a blowing apparatus 39 may optionally be provided in order to accelerate the removal of the excess material.

The lowermost run 16 of the belt 1 comprises three sections: an uppermost section 17, a central section 18 and a lowermost section 19. All these features are shown on a larger scale in FIG. 2.

These three sections 17, 18 and 19 are obtained by guiding the lowermost run 16 round over the rollers 20 and 21. At the same time, a guide plate 22 is situated beneath the uppermost section 17, a short guide plate 23 beneath the central section 18 and a guide plate 34 beneath the lowermost section 19.

Situated between the uppermost belt section 17 and the central belt section 18 is a hopper comprising an essentially vertical hopper plate 25 and a sloping hopper plate 26. These hopper plates form a hopper gap extending transversely with respect to the belt 1; the hopper is closed at the sides by means of aprons which are not shown. The guide plate 23 is situated beneath the hopper gap 27 at a distance from the vertical hopper plate 25 such that the central belt section 18 is able to move between these two, and, furthermore, at a distance from the sloping hopper plate 26 such that the material which has passed through the hopper gap 27 can be removed together with the central belt section through the discharge gap 28 formed between guide plate 23 and sloping hopper plate 26. After the material has been passed over the guide plate 23, it falls through the central belt section 18 onto the lowermost belt section 19, where it is conveyed together with said belt section 19 over the guide plate 24.

The above described apparatus with hopper according to the present invention functions as follows. An amount of material 29 having a certain layer thickness is fed with the uppermost belt section 17 over the guide plate 22. The thickness of said layer is generally not uniform since the material originates from the uppermost run 6 of the belt 1, where a portion of the material has already been used. The material slides via the sloping end or trailing edge 30 of the guide plate 22 towards the hopper formed by the plates 25, 26. Depending on the amount of material 29 fed, the hopper more or less fills up. The position of the end edge of the sloping plate 30 with respect to the edge 31 of the hopper, which is rearmost in the direction of movement of the uppermost belt section 17, is so chosen that the greatest portion of the material is propelled towards the hopper. Any fine material situated at the bottom of the layer 29 falls downwards relatively rapidly, with the result that a portion thereof finishes up in front of the rearmost edge 31 of the hopper and is removed via the overflow plate 32 adjoining the rearmost edge 31. The overflow plate 32 and the sloping hopper plate 26 may be composed of one piece of sheet material bent along a straight bending line, wherein this straight bending line defines the rearmost edge 31 of the hopper. As can be seen in FIG. 1, such material removed via the overflow plate 32 finishes up at the inlet 9 of the pump 10, with the result that it can be conveyed round again.

If more material is being fed into the hopper than is being removed via the hopper gap 27 and the discharge gap 28, an amount of material 33 will form in the hopper, which material will ultimately project above the rearmost edge 31 of the hopper. The consequence of this is that the material arriving via the trailing edge 30 of the guide plate 22 impinges on the slope fromed by the material 34 and is also removed via said slope and the overflow plate 32 to the inlet 9 of the pump 10.

Provided that the hopper formed by the plates 25, 26 is completely or partly full, a constant amount of material per unit time is removed with the central belt section 18 through the discharge gap 28, as a result of which a layer of material 35 having a constant thickness is formed on the lowermost belt section 19. The thickness of said layer 35 can be regulated by a suitable choice of the size of the openings 27, 28. Furthermore, the discharge gap 28 is preferably chosen larger than 27 in order to counteract the occurrence of blockages.

As depicted in FIG. 1, the material 35 on the lowermost run 19 is fed to the roller 2, where a deflector 36, which is known per se, is provided with which the material 35 can be conveyed around to the uppermost run 6. A layer of breadcrumb coating material having constant thickness 37 is consequently also formed on said run onto which the products 5 are fed. Further breadcrumb coating material is fed via the sieve 13 as already mentioned, as a result of which the products 5 are coated on the upper side.

Finally, provided above the slide track 12 is a sensor 38 which detects the amount of breadcrumb coating material which slides over the slide track 12. Said sensor is coupled to the drive of the screw jack 8 in a manner such that, if too little material is flowing over the slide track 12, the screw jack 18 is set in operation. The breadcrumb coating material is then fed out of the feedstock container 7 to the inlet 9 of the pump 10. The required feed of breadcrumb coating material can consequently be ensured.

I claim:

1. An apparatus for forming a continuous layer which is composed of granular or pulverulent flowable material and which is of constant thickness, said apparatus comprising:
    a belt means for transporting articles, wherein said material is capable of passing through said belt means, said belt means including an uppermost run and a lowermost run;
    guide plates positioned beneath said uppermost run and said lowermost run, wherein said material and said belt means are capable of being moved over said guide plates;
    wherein said lowermost run of said belt means is twice oppositely guided downwared in a direction of movement of said belt means whereby three belt sections are formed in said lowermost run of said belt means, said three belt sections comprises a first belt section, a second belt section positioned beneath said first belt section, a third belt section positioned beneath said second belt section;
    buffer means positioned beneath said first belt section for receiving said material, said buffer including an outlet positioned above said guide plate positioned beneath said lowermost run.

2. The apparatus of claim 1 wherein another guide means is positioned below said first belt section and includes a trailing end edge with respect to the direction of travel of said belt means, wherein said buffer is positioned near said trailing end edge whereby material from said first belt section can be fed into said buffer.

3. The apparatus of claim 2 wherein said buffer is situated between said first belt section and said second belt section.

4. The apparatus of claim 3 wherein an overflow plate adjoins a rearmost edge of said buffer, said overflow plate is positioned in a downwardly sloping direction and extends beyond said second belt section whereby said material fed by said first belt section is fed into said buffer until said buffer is full at which point said material overflows toward said overflow plate.

5. The apparatus of claim 4 wherein said buffer comprises an essentially vertical hopper plate and a second hopper plate extending downwards at an angle toward said essentially vertical hopper plate, such that said hopper plates define a hopper gap positioned between the bottom of said two hopper plates.

6. The apparatus of claim 5 wherein said overflow plate and said second hopper plate are composed of one piece of sheet material bent along a straight line, wherein said straight line defines said rearmost edge of said hopper.

7. The apparatus of claim 5 wherein a guide plate is positioned below said second belt section at a position adjacent said hopper outlet.

8. The apparatus of claim 7 wherein a slot is defined between said essentially vertical hopper plate and said guide plate positioned beneath said second belt section, wherein said slot has a size essentially corresponding to the thickness of said second belt section, and a discharge gap is defined between said second hopper plate and said guide plate positioned beneath said second belt section.

9. The apparatus of claim 8 wherein said discharge gap is larger than said hopper gap.

10. The apparatus of claim 5 wherein a portion of said guide means positioned below said first belt section which includes said trailing end edge is angled downward toward said rearmost edge of said hopper.

11. A machine for coating edible products with breadcrumbs comprising a means for forming a continuous lowermost layer of breadcrumbs of constant thickness, said means for forming a continuous lowermost layer comprising:
   a belt means for transporting said edible products, wherein said breadcrumbs are capable of passing through said belt means, said belt means including an uppermost run and a lowermost run;
   guide plates positioned beneath said uppermost run and said lowermost run, wherein said breadcrumbs and said belt means are capable of being moved over said guide plates;
   wherein said lowermost run of said belt means is twice oppositely guided downwards in a direction of movement of said belt means whereby three belt sections are formed in said lowermost run of said belt means, said three belt sections comprising a first belt section, a second belt section positioned beneath said first belt section, a third belt section positioned beneath said second belt section;
   a buffer positioned beneath said first belt section, said buffer including an outlet positioned above said guide plate positioned beneath said lowermost run;
   means for feeding the edible products onto the belt means containing the lowermost layer of breadcrumb coating material for coating the underside of said edible product;
   and means for forming an uppermost layer of breadcrumb coating material on said belt means for coating the top side of said edible product.

12. A machine according to claim 11 wherein said means for forming said uppermost layer of breadcrumb coating material includes an outlet which is positioned above said uppermost run of said belt means.

13. The machine according to claim 12 wherein a guide plate is positioned beneath said first belt section of said lowermost run, and wherein said guide plate below said uppermost run extends to a position above said guide plate positioned beneath said first belt section.

14. A machine according to claim 13 wherein said means for forming said lowermost layer of breadcrumb coating material further comprises an overflow plate adjoining a rearmost edge of said buffer, said overflow plate is positioned in a downwardly sloping direction and extends beyond said second belt section whereby said material fed by said first belt section is fed into said buffer until said buffer is full at which point said material overflows toward said overflow plate.

15. A machine according to claim 14 wherein the lower end of said overflow plate is positioned above an inlet of said means for providing the uppermost layer of material.

16. A machine according to claim 15 wherein said means for providing the uppermost layer includes an outlet which is provided with a sieve, wherein the breadcrumbs may be moved over the sieve in a direction opposite to the direction of movement of said uppermost run of said belt means, and wherein the sieve openings are larger than the size of the largest breadcrumbs.

17. The machine of claim 14 wherein said guide plate positioned beneath said uppermost run of said belt means includes a trailing edge with respect to the direction of travel of said belt means, wherein a blowing apparatus is positioned near said trailing edge of said guide plate positioned beneath said uppermost run for blowing away excess breadcrumbs toward said lowermost run of said belt means.

18. A machine according to claim 11 wherein a feed stock container with a transportation device positioned therein is provided to feed an inlet of said means for providing said uppermost layer of breadcrumb coating material, wherein a sensor is coupled to said transportation device and is situated near an outlet of said means for providing said uppermost layer of breadcrumb coating material, wherein said sensor controls the transportation device as a function of the quantity of material discharged from said outlet.

* * * * *

UNITED STATES PATENT AND TRADEMARK OFFICE
CERTIFICATE OF CORRECTION

PATENT NO. : 5,129,353

DATED : July 14, 1992

INVENTOR(S) : Wilhelmus F. Antonius Koppens

It is certified that error appears in the above-identified patent and that said Letters Patent is hereby corrected as shown below:

Column 3 Line 57 before "invention" insert --present--.

Column 4 Line 36 after "in" insert --the--.

Column 4 Lines 55-56 "feedback" should read --feedstock--.

Column 4 Line 57 "feedback" should read --feedstock--.

Column 4 Line 63 "coarse" should read --coarser--.

Column 5 Line 2 "outwardly" should read --outward--.

Column 5 Line 23 "34" should read --24--.

Column 6 Line 10 "fromed" should read --formed--.

Claim 1 Line 58 Column 6 "downwared" should read --downward--.

Signed and Sealed this

Nineteenth Day of October, 1993

Attest:

BRUCE LEHMAN

Attesting Officer     Commissioner of Patents and Trademarks